(No Model.)
F. W. COLEMAN.
NUT LOCK.
No. 545,776. Patented Sept. 3, 1895.
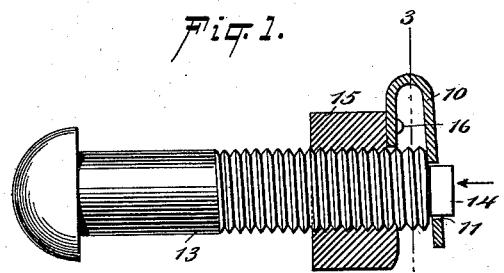
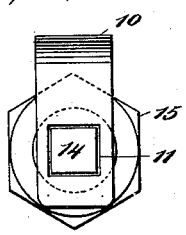 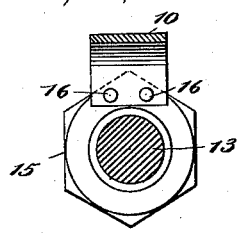
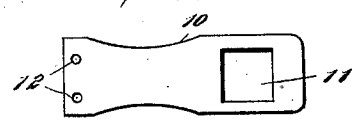
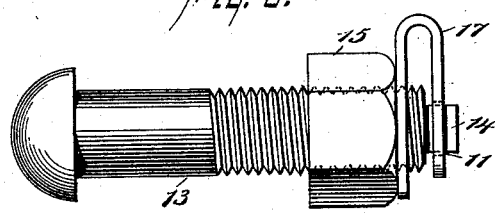
WITNESSES:
William Gaebel
Wm P Patton
INVENTOR
F. W. Coleman
BY Munn & Co
ATTORNEYS.

UNITED STATES PATENT OFFICE.

FRANCIS W. COLEMAN, OF RODNEY, MISSISSIPPI, ASSIGNOR TO THE CHICAGO GRAIN DOOR COMPANY, OF CHICAGO, ILLINOIS.

NUT-LOCK.

SPECIFICATION forming part of Letters Patent No. 545,776, dated September 3, 1895.

Application filed March 26, 1895. Serial No. 543,256. (No model.)

*To all whom it may concern:*

Be it known that I, FRANCIS W. COLEMAN, of Rodney, in the county of Jefferson and State of Mississippi, have invented a new and Improved Nut-Lock, of which the following is a full, clear, and exact description.

This invention relates to an improved lock for nuts on screw-bolts, the object being to provide a very cheap and easily-constructed device of the indicated character, which is reliable in service and that may be readily applied or removed from the bolt end whereon the improvement has been placed.

A further object is to provide a locking device which may be used separately from the nut it is to secure from turning back on a screw-bolt and afford effective service as a nut-lock or be employed alone to serve the dual purpose of a nut and lock for the same.

The invention consists in the peculiar construction of the nut-lock, and also in the combination of the nut-lock with a screw-threaded nut and bolt, as is hereinafter described, and indicated in the claims.

Reference is to be had to the accompanying drawings, forming a part of this specification, in which similar figures of reference indicate corresponding parts in all the views.

Figure 1 is a side view of a threaded bolt embodying part of the improvement, a nut thereon, and the improved locking device secured to the nut and interlocked with the bolt end. Fig. 2 is an end view of the improvement on a bolt and nut, seen in direction of an arrow in Fig. 1. Fig. 3 is a transverse sectional view, on the line 3 3 in Fig. 1. Fig. 4 is a side view of the main feature of the improvement unbent, and Fig. 5 is a side view of a bolt and nut whereon the improved locking-piece is applied to jam the nut.

The improvement is generally applicable to screw-bolts and nuts therefor of any dimensions and style of construction, it only being essential that the threaded end of the bolt be accessible for application of the improvement and that the nut is not too far removed from this terminal of the bolt-body.

The nut-lock 10 consists, essentially, of a comparatively-thin metal strip that for efficient service is preferably elastic. The preferred form for the piece 10 is indicated in Fig. 4, where the planchet composing it is shown unbent, and as represented consists of an elongated blank, which can conveniently be cut and shaped from sheet metal by ordinary means. Near one end of the blank 10 a square or other polygonal-shaped aperture 11 is formed, and near the opposite end of said piece one or more small perforations 12 are produced, two being shown.

The threaded end of the bolt-body 13, that is to receive the improvement, is shaped to loosely fit into the polygonal aperture 11, as shown at 14. The blank 10 is return-bent sidewise to give it a substantially U shape, and if the locking device is to be secured on the adjacent end of a nut such as 15, that may have any desired shape, peripherally considered, then the member of the U-shaped nut-lock that is apertured is made longer than the other limb of the same, which is designed to be affixed upon the nut 15. Preferably the nut 15 is recessed on the end that is to receive the limb of the nut-lock 10, so that said limb will fit neatly in the recess and avoid projection beyond the end wall of the nut, and suitable pins or rivets 16 are projected from the nut at points which will enter them in the perforations 12, and the parts 10 15 may be secured together by riveting the projecting ends of the pins 16. It is feasible to employ but one rivet 16 for attaching the limb of the nut-lock to the nut, if the face of said nut is recessed, as has been described.

It will be seen that if the member of the nut-lock which is apertured has a suitable length, so as to dispose the aperture opposite the polygonal-shaped end portion of the bolt when the nut 15 is screwed upon said bolt, then if the nut is so located on the bolt-body that pressure is had by the apertured member of the nut-lock on the end of the bolt as soon as the corners of the aperture 11 come directly opposite the angles of the polygonal end 14 of the bolt-body the resilience of the apertured elastic member will cause the latter to spring inwardly or toward the nut 15, and thus interlock the bolt and piece 10, which will lock the nut 15 on the bolt. If the member of the nut-lock that engages the bolt end is not elastic, then it can be bent so as to effect a locking engagement therewith in an obvious manner. For removal of the apertured member of the nut-lock 10 from the polygonal-shaped and mating end of the bolt-body it is only necessary to press the member outwardly, which will detach it from the bolt end, whereupon the nut may be rotated to remove it or change its position on the bolt-body.

The modification shown in Fig. 5 is but a slightly-altered construction of the improvement to adapt it for use independently of a nut or to serve to jam the nut.

It will be seen that in this construction the bowed locking-piece 17 has its limb that is to engage the threaded body of the bolt perforated and tapped to adapt the said limb for a threaded engagement with the bolt, the limb being suitably lengthened to permit such a formation of the same. The other member of the locking device is apertured in polygonal form, as has already been described with regard to the nut-lock 10, and said apertured member is made to engage with the polygonal-shaped end of the bolt whereon the locking device is to be applied.

It will be apparent that the locking device in the modified form will be adapted to serve alone as a nut and lock therefor, and if a proper thickness is afforded the threaded limb of the device effective service will be rendered by it, such a nut and lock being particularly well adapted for use on small bolts or shaft ends of machinery that must be locked from longitudinal displacement. The modification may also be utilized to serve as a jam-nut and lock for a nut such as 15, and is represented in Fig. 5 in connection therewith, the application being evidently practical, as the nut 15 may be placed in position on the bolt-body and the locking device made to press against the end of the nut, as shown, the apertured member of the locking device being interlocked with the end of the bolt, as before explained.

In case the nut 15 is to be placed at some distance from the end of the bolt and out of range with regard to the locking appliance, there may be a suitable number of washers strung on the bolt-body between the nut 15 and polygonal end of the bolt, which washers will lie intermediate of the apertured and threaded limb of the locking device and nut, which will enable the effective application of the device to lock the nut 15.

It is apparent that the improvement is extremely simple and cheap to introduce and that the application of the improved nut-lock will reliably hold a nut of any size from reverse movement on a threaded bolt, the nut-lock being proportioned to suit the dimensions of the bolt and nut with which it is to engage.

Having thus fully described my invention, I claim as new and desire to secure by Letters Patent—

1. In a nut lock, the combination, with the threaded bolt, having a reduced non-circular terminal, of the threaded nut having a projecting jaw bent to engage with said bolt terminal, substatially as described.

2. A nut lock, comprising a U-shaped plate, one limb of which is adapted to engage the outer face of a nut, the other limb being provided with an angular opening to receive the correspondingly shaped end of a bolt, substantially as described.

3. A nut lock, comprising a U-shaped plate, one limb being constructed to be secured to the face of a nut and its other limb provided with an angular opening to receive the correspondingly shaped end of a bolt, substantially as described.

4. A nut lock, comprising a nut and a U shaped elastic plate having one limb fixedly secured to the nut and its other limb provided with an angular opening to receive the correspondingly shaped end of a bolt, substantially as described.

5. In a nut lock, the combination with a threaded bolt and a screw nut thereon, of a locking device, comprising an elastic U shaped plate, one limb of which is seated and secured in a recess on the end of the nut, and the other limb of said plate polygonally apertured to fit on a polygonal-shaped end of the screw-bolt, substantially as described.

FRANCIS W. COLEMAN.

Witnesses:
JAMES N. BECK,
I. A. LIMERICK.